(12) United States Patent
Brothers et al.

(10) Patent No.: US 7,932,333 B2
(45) Date of Patent: Apr. 26, 2011

(54) AQUEOUS POLYMERIZATION OF FLUORINATED MONOMER USING POLYMERIZATION AGENT COMPRISING HIGH MOLECULAR WEIGHT FLUOROPOLYETHER ACID OR SALT AND FLUOROPOLYETHER ACID OR SALT SURFACTANT

(75) Inventors: Paul Douglas Brothers, Chadds Ford, PA (US); Subash Vishnu Gangal, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 93 days.

(21) Appl. No.: 11/937,548

(22) Filed: Nov. 9, 2007

(65) Prior Publication Data

US 2008/0114122 A1 May 15, 2008

Related U.S. Application Data

(60) Provisional application No. 60/857,960, filed on Nov. 9, 2006, provisional application No. 60/858,010, filed on Nov. 9, 2006.

(51) Int. Cl.
*C08F 14/18* (2006.01)

(52) U.S. Cl. ......... 526/242; 526/206; 526/209; 526/214

(58) Field of Classification Search .................. 526/242, 526/206, 209, 214
See application file for complete search history.

(56) References Cited

U.S. PATENT DOCUMENTS

| | | |
|---|---|---|
| 2,559,752 A | 7/1951 | Berry |
| 2,713,593 A | 7/1955 | Brice et al. |
| 3,271,341 A | 9/1966 | Garrison, Jr. |
| 3,282,875 A | 11/1966 | Connolly et al. |
| 3,291,843 A | 12/1966 | Fritz et al. |
| 3,391,099 A | 7/1968 | Punderson |
| 3,839,425 A | 10/1974 | Bartlett |
| 4,036,802 A | 7/1977 | Poirier |
| 4,358,545 A | 11/1982 | Ezzell et al. |
| 4,380,618 A | 4/1983 | Khan et al. |
| 4,381,384 A | 4/1983 | Khan |
| 4,463,144 A | 7/1984 | Kojima et al. |
| 4,552,631 A | 11/1985 | Bissot et al. |
| 4,621,116 A | 11/1986 | Morgan |
| 4,743,658 A | 5/1988 | Imbalzano et al. |
| 4,789,717 A | 12/1988 | Giannetti et al. |
| 4,864,006 A | 9/1989 | Giannetti et al. |
| 5,285,002 A | 2/1994 | Grootaert |
| 5,637,748 A | 6/1997 | Hung et al. |
| 5,688,884 A | 11/1997 | Baker et al. |
| 5,763,552 A | 6/1998 | Feiring et al. |
| 5,789,508 A | 8/1998 | Baker et al. |
| 5,925,705 A | 7/1999 | Araki et al. |
| 5,959,026 A | 9/1999 | Abusleme et al. |
| 6,177,196 B1 | 1/2001 | Brothers et al. |
| 6,300,445 B1 | 10/2001 | Hung et al. |
| 6,395,848 B1 * | 5/2002 | Morgan et al. ............... 526/214 |
| 6,429,258 B1 | 8/2002 | Morgan et al. |
| 6,465,577 B2 | 10/2002 | Okanishi et al. |
| 6,841,616 B2 | 1/2005 | Wille et al. |
| 6,869,997 B2 | 3/2005 | Wille et al. |
| 6,878,772 B2 * | 4/2005 | Visca et al. .................. 524/757 |
| 7,141,537 B2 | 11/2006 | Audenaert et al. |
| 7,705,074 B2 | 4/2010 | Brothers et al. |
| 2004/0072977 A1 | 4/2004 | Kaulbach et al. |
| 2005/0090613 A1 | 4/2005 | Maruya et al. |
| 2006/0166007 A1* | 7/2006 | Kent et al. ..................... 428/421 |
| 2006/0281946 A1 | 12/2006 | Morita et al. |
| 2007/0015864 A1 | 1/2007 | Hintzer et al. |
| 2007/0015865 A1 | 1/2007 | Hintzer et al. |
| 2007/0015866 A1 | 1/2007 | Hintzer et al. |
| 2007/0015937 A1 | 1/2007 | Hintzer et al. |
| 2007/0142541 A1 | 6/2007 | Hintzer et al. |

FOREIGN PATENT DOCUMENTS

| | | |
|---|---|---|
| EP | 0 148 482 B1 | 7/1985 |
| EP | 0250767 B1 | 9/1991 |
| EP | 1679352 A2 | 7/2006 |
| EP | 1334996 B1 | 11/2008 |
| GB | 1292268 | 10/1972 |
| JP | 2003119204 A | 4/2003 |
| JP | 2004358397 A | 12/2004 |
| JP | 2004359870 A | 12/2004 |
| JP | 3900883 B2 | 4/2007 |
| WO | 99/37720 | 7/1999 |
| WO | WO 01/46116 A1 | 6/2001 |
| WO | 02/30848 A1 | 4/2002 |
| WO | WO 2007/046345 A1 | 4/2007 |
| WO | WO 2007/046377 A1 | 4/2007 |
| WO | WO 2007/046482 A1 | 4/2007 |
| WO | WO 2007/049517 A1 | 5/2007 |

OTHER PUBLICATIONS

Kasai, "Perfluoropolyethers with Acid End Groups: Amphiphilicity and Emulsification", Journal of Applied Science, vol. 57, 1995, pp. 797-809.

Hill, "Silicone Surfactants", Marcel Dekker Inc., ISBN 0-8247-00104, vol. 86, pp. 5-6, 1999.

* cited by examiner

*Primary Examiner* — Kelechi C Egwim

(57) ABSTRACT

A process comprising polymerizing at least one fluorinated monomer in an aqueous medium containing initiator and polymerization agent to form an aqueous dispersion of particles of fluoropolymer, the polymerization agent comprising fluoropolyether acid or salt thereof having a number average molecular weight of at least about 800 g/mol; and fluoropolyether acid or salt surfactant.

21 Claims, No Drawings

AQUEOUS POLYMERIZATION OF FLUORINATED MONOMER USING POLYMERIZATION AGENT COMPRISING HIGH MOLECULAR WEIGHT FLUOROPOLYETHER ACID OR SALT AND FLUOROPOLYETHER ACID OR SALT SURFACTANT

FIELD OF THE INVENTION

This invention relates to a process for the dispersion polymerization of fluorinated monomer in an aqueous polymerization medium.

BACKGROUND OF THE INVENTION

A typical process for the aqueous dispersion polymerization of fluorinated monomer includes feeding fluorinated monomer to a heated reactor containing a fluorosurfactant and deionized water. Paraffin wax is employed in the reactor as a stabilizer for some polymerizations, e.g., polytetrafluoroethylene (PTFE) homopolymers. A free-radical initiator solution is employed and, as the polymerization proceeds, additional fluorinated monomer is added to maintain the pressure. A chain transfer agent is employed in the polymerization of some polymers, e.g., melt-processible TFE copolymers to control melt viscosity. After several hours, the feeds are stopped, the reactor is vented and purged with nitrogen, and the raw dispersion in the vessel is transferred to a cooling vessel.

For use in fluoropolymer coatings for metals, glass and fabric, polymer dispersion is typically transferred to a dispersion concentration operation which produces stabilized dispersions used as coatings. Certain grades of PTFE dispersion are made for the production of fine powder. For this use, the dispersion is coagulated, the aqueous medium is removed and the PTFE is dried to produce fine powder. Dispersions of melt-processible fluoropolymers for molding resin use are also coagulated and the coagulated polymer dried and then processed into a convenient form such as flake, chip or pellet for use in subsequent melt-processing operations.

As described in U.S. Pat. No. 3,391,099 to Punderson, dispersion polymerization involves two generally distinct phases. The initial period of the reaction is a nucleation phase in which a given number of polymerization sites or nuclei are established. Subsequently, there occurs a growth phase in which polymerization of fluorinated monomer on established particles occurs with little or no formation of new particles. Successful production of the high solids fluoropolymer dispersion generally requires the presence of the fluorosurfactant, especially in the later growth phase of polymerization in order to stabilize the dispersion preventing coagulation of the fluoropolymer particles.

Fluorosurfactants used in the polymerization are usually anionic, non-telogenic, soluble in water and stable to reaction conditions. The most widely used fluorosurfactants are perfluoroalkane carboxylic acids and salts as disclosed in U.S. Pat. No. 2,559,752 to Berry, specifically perfluorooctanoic acid and salts, often referred to as C8, and perfluorononanoic acid and salts, often referred to as C9. Because of recent environmental concerns with regard to perfluorooctanoic acid and salts, there is interest in reducing or eliminating perfluorooctanoic acid and its salts in fluoropolymer polymerization processes.

Perfluoroether carboxylic acids and salts (i.e., perfluoropolyethers with ionic end groups) are disclosed in U.S. Pat. No. 3,271,341 to Garrison and U.S. Pat. No. 3,391,099 to Punderson for use in the aqueous polymerization of fluorinated monomers. U.S. Pat. No. 4,864,006 to Gianetti et al. discloses the polymerization of fluorinated monomers in the presence of a perfluoropolyether having neutral end groups, perfluoropolyether oil, which is used in the form of an aqueous microemulsion. The perfluoropolyether oil has molecular weight of at least about 500 and the aqueous microemulsion of the oil is prepared using a suitable surfactant which can be selected from known perfluorinated carboxylic or sulfonic acids or from perfluoropolyethers having one or two acid end groups.

In U.S. Pat. No. 6,395,848 to Morgan et al., aqueous dispersion polymerization of fluorinated monomers is improved by using a combination of fluorosurfactant and perfluoropolyether carboxylic or sulfonic acid or salt thereof. The perfluoropolyether carboxylic or sulfonic acid or salt thereof employed in the examples of Morgan et al. have molecular weights ranging from 2000 to 7500. The fluorosurfactant disclosed by Morgan et al. is fluoroalkyl carboxylic or sulfonic acid or salt thereof or fluoroalkoxy aryl sulfonic acid or salt thereof. Morgan et al. teaches that the fluoroalkyl group of fluoroalkyl carboxylic or sulfonic acid surfactants contains at most one ether oxygen and thus is not polyether.

SUMMARY OF THE INVENTION

A process in accordance with the invention comprises polymerizing at least one fluorinated monomer in an aqueous medium containing initiator and polymerization agent to form an aqueous dispersion of particles of fluoropolymer, the polymerization agent comprising:

fluoropolyether acid or salt thereof having a number average molecular weight of at least about 800 g/mol; and fluoropolyether acid or salt surfactant.

Preferably, fluoropolyether acid or salt surfactant is a compound having the formula:

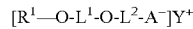

wherein:

$R^1$ is a linear or branched partially or fully fluorinated aliphatic group which may contain ether linkages;

$L^1$ and $L^2$ are a linear or branched alkylene groups which may be the same or different nonfluorinated, partially fluorinated or fully fluorinated and which may contain ether linkages;

$A^-$ is an anionic group selected from the group consisting of carboxylate, sulfonate, sulfonamide anion, and phosphonate; and $Y^+$ is hydrogen, ammonium or alkali metal cation.

Preferably, the fluoropolyether acid or salt surfactant has a molecular weight of less than about 600 g/mol.

A process in accordance with the invention employing the polymerization agent comprising a fluoropolyether acid or salt thereof having a number average molecular weight of at least about 800 g/mol and fluoropolyether acid or salt surfactant provides reduced undispersed polymer (also referred to as coagulum) compared to fluoropolyether acid or salt surfactant used alone.

DETAILED DESCRIPTION OF THE INVENTION

Fluoropolymer

Fluoropolymer dispersions formed by this invention are comprised of particles of fluoropolymer made from at least one fluorinated monomer, i.e., wherein at least one of the monomers contains fluorine, preferably an olefinic monomer with at least one fluorine or a perfluoroalkyl group attached to a doubly-bonded carbon. The fluorinated monomer used in the process of this invention is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether). A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF-O-CF_2CF_2SO_2F$). Another example is $CF_2=CF-O-CF_2-CF(CF_3)-O-CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

The invention is especially useful when producing dispersions of polytetrafluoroethylene (PTFE) including modified PTFE. PTFE and modified PTFE typically have a melt creep viscosity of at least about $1 \times 10^8$ Pa·s and, with such high melt viscosity, the polymer does not flow significantly in the molten state and therefore is not a melt-processible polymer. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The modified PTFE contains a small amount of comonomer modifier which improves film forming capability during baking (fusing), such as perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred. Chlorotrifluoroethylene (CTFE), perfluorobutyl ethylene (PFBE), or other monomer that introduces bulky side groups into the molecule are also included.

The invention is especially useful when producing dispersions of melt-processible fluoropolymers. By melt-processible, it is meant that the polymer can be processed in the molten state (i.e., fabricated from the melt into shaped articles such as films, fibers, and tubes etc. that exhibit sufficient strength and toughness to be useful for their intended purpose) using conventional processing equipment such as extruders and injection molding machines. Examples of such melt-processible fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of TFE homopolymer, polytetrafluoroethylene (PTFE), e.g., to a melting temperature no greater than 315° C.

A melt-processible TFE copolymer typically incorporates an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s measured at 372° C. by the method of ASTM D-1238 modified as described in U.S. Pat. No. 4,380,618. Additional melt-processible fluoropolymers are the copolymers of ethylene (E) or propylene (P) with TFE or CTFE, notably ETFE, ECTFE and PCTFE.

A preferred melt-processible copolymer for use in the practice of the present invention comprises at least about 40-98 mol % tetrafluoroethylene units and about 2-60 mol % of at least one other monomer. Preferred comonomers with TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFPNF2).

Further useful polymers are film forming polymers of polyvinylidene fluoride (PVDF) and copolymers of vinylidene fluoride as well as polyvinyl fluoride (PVF) and copolymers of vinyl fluoride.

The invention is also useful when producing dispersions of fluorocarbon elastomers. These elastomers typically have a glass transition temperature below 25° C. and exhibit little or no crystallinity at room temperature. Fluorocarbon elastomer copolymers made by the process of this invention typically contain 25 to 70 wt %, based on total weight of the fluorocarbon elastomer, of copolymerized units of a first fluorinated monomer which may be vinylidene fluoride (VF2) or tetrafluoroethylene (TFE). The remaining units in the fluorocarbon elastomers are comprised of one or more additional copolymerized monomers, different from said first monomer, selected from the group consisting of fluorinated monomers, hydrocarbon olefins and mixtures thereof. Fluorocarbon elastomers prepared by the process of the present invention may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluorocarbon elastomer copolymers include TFE/PMVE, TFE/PMVE/E, TFE/P and TFE/PNF2. Preferred VF2 based fluorocarbon elastomer copolymers include VF2/HFP, VF2/HFP/TFE, and VF2/PMVE/TFE. Any of these elastomer copolymers may further comprise units of cure site monomer.

Fluoropolyether Surfactant

The fluoropolyether surfactant employed in accordance with the invention is fluoropolyether acid or salt surfactant. Preferably, the fluoropolyether acid or salt surfactant has a molecular weight of less than about 600 g/mol. More preferably, the fluoropolyether acid or salt surfactant has a molecular weight of less than about 500 g/mol. Most preferably, the fluoropolyether acid or salt surfactant has a molecular weight of about 300 to about 500 g/mol.

"Chain length" as used in this application refers to the number of atoms in the longest linear chain in the hydrophobic tail of the fluoropolyether acid or salt surfactant employed in the process of this invention. Chain length includes atoms such as oxygen atoms in addition to carbon in the chain of hydrophobic tail of the fluoropolyether surfactant but does not include branches off of the longest linear chain or include atoms of the anionic group, e.g., does not include the carbon in carboxylate. "Short chain" as used in this application refers to a chain length of not greater than 6. "Long chain" refers to a chain length of greater than 6, e.g., fluoropolyether acid or salts having a chain length of 7 to 14 atoms. Preferably, the chain length of $R^1$—O-$L^1$-O-$L^2$- is a long chain, i.e., greater than 6 atoms.

Preferably, the fluoropolyether acid or salt surfactant is a compound of the Formula I below:

$$[R^1\text{—O-}L^1\text{-O-}L^2\text{-}A^-]Y^+ \qquad (I)$$

wherein:

$R^1$ is a linear or branched partially or fully fluorinated aliphatic group which may contain ether linkages;

$L^1$ and $L^2$ are a linear or branched alkylene groups which may be the same or different nonfluorinated, partially fluorinated or fully fluorinated and which may contain ether linkages;

$A^-$ is an anionic group selected from the group consisting of carboxylate, sulfonate, sulfonamide anion, and phosphonate; and $Y^+$ is hydrogen, ammonium or alkali metal cation.

Fluoropolyether surfactants within the scope of Formula I with significant hydrocarbon content can have molecular weights as low as 138 g/mol but may be unacceptably telogenic. Molecular weights above about 150 are preferably employed in accordance with the invention.

Preferred fluoroether acids or salts in the accordance with the invention are fluoropolyether surfactants according to Formula I wherein:

$R^1$ is a linear or branched partially or fully fluorinated alkyl group having 1 to 4 carbon atoms which may contain ether linkages; and $L^1$ and $L^2$ are alkylene groups independently selected from —CX($R^2$)— and —CX($R^2$)C$Z^1Z^2$— wherein $R^2$ is fluorine or perfluoromethyl and X is hydrogen or fluorine, and —C$Z^1Z^2$C$Z^3Z^4$—, wherein $Z^1$, $Z^2$, $Z^3$, and $Z^4$ are independently selected from hydrogen or fluorine, and —C$Z^1Z^2$C$Z^3Z^4$C$Z^5Z^6$—, wherein $Z^1$, $Z^2$, $Z^3$, $Z^4$, $Z^5$, and $Z^6$ are independently selected from hydrogen or fluorine. In preferred embodiments of the invention, $L^1$ and $L^2$ are alkylene groups independently selected from —CF(CF$_3$), —CF(CF$_3$)CF$_2$—, —CF$_2$—, —CF$_2$CF$_2$—, —CF$_2$CF$_2$CF$_2$—, —CHFCF$_2$—, and —CF$_2$CHF—.

Fluoroether acids and salts of this type are known. When L is an alkylene group selected from —CX($R^2$)—, wherein $R^2$ is fluorine or perfluoromethyl and X is hydrogen or fluorine, the compound can be made, for example, by hydrolysis of perfluoro-2-alkoxypropionyl fluoride intermediates prepared by reacting alkanoic acid fluorides with hexafluoropropylene epoxide as disclosed in U.S. Pat. No. 3,291,843 to Fritz and Selman for use in perfluoro(alkyl vinyl ether) manufacture.

When $L^1$ and $L^2$ are independently selected from —C$Z^1Z^2$C$Z^3Z^4$— and —C$Z^1Z^2$C$Z^3Z^4$C$Z^5Z^6$—, and wherein Z is independently selected from hydrogen or fluorine, routes to making such compounds are generally described In U.S. Pat. No. 2,713,593 (Brice et al.) where fluoro(alkoxypropionic) acids and derivatives are obtained in useful yields from corresponding hydrocarbon alkoxypropionic acids and derivatives by electrochemical fluorination. Fully fluorinated and partially fluorinated products can be separated for example by fractional distillation. Useful teachings for synthesis can also be found in EP 0 148 482 B1 (Ohsaka et al.) for partially fluorinated propoxy prop ionic acid fluoride which may be further fluorinated or perfluorinated by electrofluorinating the acid fluoride which is then easily converted to an acid or salt. A preferred class of fluoropolyether surfactants are diether acids or salts, i.e., wherein R, $L^1$, and $L^2$ do not contain ether linkages.

In accordance with another preferred form of the invention, $R^1$ in Formula I is a linear partially or fully fluorinated alkyl group having 2 to 3 carbon atoms. Preferably, $R^1$ is fully fluorinated.

In accordance with another preferred form of the invention, the fluorosurfactant is highly fluorinated. "Highly fluorinated" means that at least about 50% of the total number of fluorine and hydrogen atoms in the fluorosurfactant are fluorine atoms. More preferably, at least about 75% of the total number of fluorine and hydrogen atoms in the fluorosurfactant are fluorine atoms, most preferably at least about 90%. Perfluorinated surfactants are also preferred for use in accordance with the invention.

In accordance with one preferred embodiment of the invention, the fluoropolyether surfactant is a compound of the Formula II:

$$CF_3CF_2OCF_2CF_2OCF_2COO^-Y^+ \qquad (II)$$

wherein $Y^+$ is hydrogen, ammonium, or alkali metal cation. This is a compound is represented by Formula I wherein $R^1$ is $CF_3CF_2$—; $L^1$ is —$CF_2CF_2$—; $L^2$ is —$CF_2$—; $A^-$ is carboxylate; and $Y^+$ is hydrogen, ammonium or alkali metal cation. Preferably, $Y^+$ is hydrogen or ammonium. A compound of this formula can be obtained by polymerization of tetrafluoroethylene epoxide as taught by U.S. Pat. No. 3,271,341 (Garrison) with the subsequent hydrolysis of the acid fluoride to produce the fluoropolyether surfactant acid or salt.

Fluoropolyether Acid or Salt

The other component of the polymerization agent combination used in the practice of the present invention is a fluoropolyether acid or salt thereof. Preferably, the fluoropolyether is a perfluoropolyether acid or salt thereof. The acid groups of the fluoropolyether acid or salt thereof preferably are acid groups selected from carboxylic acid, sulfonic acid, sulfonamide, phosphonic acid. In preferred embodiments, the acid group of the fluoropolyether acid or salt is carboxylic acid. Preferably, the fluoropolyether acid is employed as a salt during polymerization, most preferably, an ammonium salt.

Preferred perfluoropolyether (PFPE) acids or salts thereof for use in accordance with the present invention can have any chain structure in which oxygen atoms in the backbone of the molecule are separated by saturated fluorocarbon groups having 1-3 carbon atoms. More than one type of fluorocarbon group may be present in the molecule. Representative structures have the repeat unit represented in the following formulas:

$$(-CFCF_3-CF_2-O-)_n \qquad (III)$$

$$(-CF_2-CF_2-CF_2-O-)_n \qquad (IV)$$

$$(-CF_2-CF_2-O-)_n-(-CF_2-O-)_m \qquad (V)$$

$$(-CF_2-CFCF_3-O-)_n-(-CF_2-O-)_m \qquad (VI)$$

These structures are discussed by Kasai in J. Appl. Polymer Sci. 57, 797 (1995). As disclosed therein, such PFPE can have a carboxylic acid group or salt thereof at one end or at both ends. Similarly, such PFPE may have a sulfonic acid or phosphonic acid group or salt thereof at one end or both ends. In addition, PFPE with acid functionality at both ends may have a different group at each end. For monofunctional PFPE, the other end of the molecule is usually perfluorinated but may contain a hydrogen or chlorine atom. PFPE having an acid group at one or both ends for use in the present invention has at least 2 ether oxygens, preferably at least 4 ether oxygens, and even more preferably at least 6 ether oxygens. Preferably, at least one of the fluorocarbon groups separating ether oxygens, and more preferably at least two of such fluorocarbon groups, have 2 or 3 carbon atoms. Even more preferably, at least 50% of the fluorocarbon groups separating ether oxygens have 2 or 3 carbon atoms. Also, preferably, the PFPE has a total of at least 15 carbon atoms, e.g., the preferred minimum value of n or n+m in the above repeat unit structures is at least 5. More than one PFPE having an acid group at one or both ends can be used in a process in accordance with the invention. Typically, unless extraordinary care is employed to manufacture a single specific PFPE compound, the PFPE may contain multiple compounds in varying proportions within a molecular weight range about the average molecular weight.

The fluoropolyether acid or salt thereof has an average molecular weight which enables it to function in combination with fluoropolyether acid or salt surfactant as a polymerization agent in a process in accordance with the present invention. The number average molecular weight of the fluoropolyether acid or salt employed in accordance with the present invention is greater than about 800 g/mol. Fluoropolyether acids or salts with a number average molecular weight of greater than about 800 g/mol are defined in this patent application to be "polymeric fluoropolyethers". The number average molecular weight of the fluoropolyether acids or salts employed is usually less than about 6000 g/mol because fluoropolyether acids or salt with very high molecular weights generally are difficult to disperse in the aqueous polymerization medium. More preferably, the fluoropolyether acid or salt thereof employed in accordance with the invention has a number average molecular weight of about 800 to about 3500 g/mol, and most preferably 1000 to about 2500 g/mol.

Process

In the practice of a preferred embodiment of the invention, the process is carried out as a batch process in a pressured reactor. Suitable vertical or horizontal reactors for carrying out the process of the invention are equipped with stirrers for the aqueous medium to provide sufficient contact of gas phase monomers such as TFE for desirable reaction rates and uniform incorporation of comonomers if employed. The reactor preferably includes a cooling jacket surrounding the reactor so that the reaction temperature may be conveniently controlled by circulation of a controlled temperature heat exchange medium.

In a typical process, the reactor is first charged with deionized and deaerated water of the polymerization medium and fluoropolyether acid or salt and fluoropolyether surfactant are dispersed in the medium. The dispersing of the fluoropolyether acid or salt and fluoropolyether surfactant are discussed in more detail hereinafter. For PTFE homopolymer and modified PTFE, paraffin wax as stabilizer is often added. A suitable procedure for PTFE homopolymer and modified PTFE includes first pressurizing the reactor with TFE. If used, the comonomer such as HFP or perfluoro(alkyl vinyl ether) is then added. A free-radical initiator solution such as ammonium persulfate solution is then added. For PTFE homopolymer and modified PTFE, a second initiator which is a source of succinic acid such as disuccinyl peroxide may be present in the initiator solution to reduce coagulum. Alternatively, a redox initiator system such as potassium permanganate/oxalic acid is used. The temperature is increased and, once polymerization begins, additional TFE is added to maintain the pressure. The beginning of polymerization is referred to as kick-off and is defined as the point at which gaseous monomer feed pressure is observed to drop substantially, for example, about 10 psi (about 70 kPa). Comonomer and/or chain transfer agent can also be added as the polymerization proceeds. For some polymerizations, additional monomers, initiator and or polymerization agent may be added during the polymerization.

Batch dispersion polymerizations can be described as proceeding in two phases. The initial period of the reaction can be said to be a nucleation phase during which a given number particles are established. Subsequently, it can be said that a growth phase occurs in which the predominant action is polymerization of monomer on established particles with little or no formation of new particles. The transition from the nucleation to the growth phase of polymerization occurs smoothly, typically between about the 4 and about the 10 percent solids in for the polymerization of TFE.

After batch completion (typically several hours) when the desired amount of polymer or solids content has been achieved, the feeds are stopped, the reactor is vented and purged with nitrogen, and the raw dispersion in the vessel is transferred to a cooling vessel.

The solids content of the dispersion upon completion of polymerization can be varied depending upon the intended use for the dispersion. For example, the process of the invention can be employed to produce a "seed" dispersion with low solids content, e.g., less than 10%, which is employed as "seed" for a subsequent polymerization process to a higher solids level. In other processes, the solids content of fluoropolymer dispersion produced by the process of the invention is preferably at least about 10 wt %. More preferably, the fluoropolymer solids content is at least about 20 wt %. A preferred range for fluoropolymer solids content produced by the process is about 20 wt % to about 65 wt %, even more preferably about 20 wt % to about 55 wt %, most preferably, about 35 wt % to about 55 wt %.

In a preferred process of the invention, polymerizing produces less that about 10 wt %, more preferably less than 3 wt %, even more preferably less than 1 wt %, most preferably less that about 0.5 wt % undispersed fluoropolymer (coagulum) based on the total weight of fluoropolymer produced.

The as-polymerized dispersion can be stabilized with anionic, cationic, or nonionic surfactant for certain uses. Typically however, the as-polymerized dispersion is transferred to a dispersion concentration operation which produces concentrated dispersions stabilized typically with nonionic surfactants by known methods. Solids contents of concentrated dispersion is typically about 35 to about 70 wt %. Certain grades of PTFE dispersion are made for the production of fine powder. For this use, the dispersion is coagulated, the aqueous medium is removed and the PTFE is dried to produce fine powder.

The dispersion polymerization of melt-processible copolymers is similar except that comonomer in significant quantity is added to the batch initially and/or introduced during polymerization. Chain transfer agents are typically used in significant amounts to decrease molecular weight to increase melt flow rate. The same dispersion concentration operation can be used to produce stabilized concentrated dispersions. Alternatively, for melt-processible fluoropolymers uses as molding resin, the dispersion is coagulated and the aqueous medium is removed. The fluoropolymer is dried then processed into a convenient form such as flake, chip or pellet for use in subsequent melt-processing operations.

The process of the invention may also be carried out as a continuous process in a pressurized reactor. A continuous process is especially useful for the manufacture of fluorocarbon elastomers.

Initiators

Polymerization in accordance with the invention employs free radical initiators capable of generating radicals under the conditions of polymerization. As is well known in the art, initiators for use in accordance with the invention are selected based on the type of fluoropolymer and the desired properties to be obtained, e.g., end group type, molecular weight, etc. For some fluoropolymers such as melt-processible TFE copolymers, water-soluble salts of inorganic peracids are employed which produce anionic end groups in the polymer. Preferred initiators of this type have a relatively long half-life, preferably persulfate salts, e.g., ammonium persulfate or potassium persulfate. To shorten the half-life of persulfate initiators, reducing agents such as ammonium bisulfite or sodium metabisulfite, with or without metal catalyst salts such as Fe, can be used. Preferred persulfate initiators are substantially free of metal ions and most preferably are ammonium salts.

For the production of PTFE or modified PTFE dispersions for dispersion end uses, small amounts of short chain dicarboxylic acids such as succinic acid or initiators that produce succinic acid such as disuccinic acid peroxide (DSP) are preferably also added in addition to the relatively long half-life initiators such as persulfate salts. Such short chain dicarboxylic acids are typically beneficial in reducing undispersed polymer (coagulum). For the production of PTFE dispersion for the manufacture of fine powder, a redox initiator system such as potassium permanganate/oxalic acid is often used.

The initiator is added to the aqueous polymerization medium in an amount sufficient to initiate and maintain the polymerization reaction at a desired reaction rate. At least a portion of the initiator is preferably added at the beginning of the polymerization. A variety of modes of addition may be used including continuously throughout the polymerization, or in doses or intervals at predetermined times during the polymerization. A particularly preferred mode of operation is for initiator to be precharged to the reactor and additional initiator to be continuously fed into the reactor as the polymerization proceeds. Preferably, total amounts of ammonium persulfate and/or potassium persulfate employed during the course of polymerization are about 25 ppm to about 250 ppm based on the weight of the aqueous medium. Other types of initiators, for example, potassium permanganate/oxalic acid initiators, can be employed in amounts and in accordance with procedures as known in the art.

Chain Transfer Agents

Chain-transfer agents may be used in a process in accordance with the invention for the polymerization of some types of polymers, e.g., for melt-processible TFE copolymers, to decrease molecular weight for the purposes of controlling melt viscosity. Chain transfer agents useful for this purpose are well-known for use in the polymerization of fluorinated monomers. Preferred chain transfer agents include hydrogen, aliphatic hydrocarbons, halocarbons, hydrohalocarbons or alcohol having 1 to 20 carbon atoms, more preferably 1 to 8 carbon atoms. Representative examples of such chain transfer agents are alkanes such as ethane, chloroform, 1,4-diiodoperfluorobutane and methanol.

The amount of a chain transfer agent and the mode of addition depend on the activity of the particular chain transfer agent and on the desired molecular weight of the polymer product. A variety of modes of addition may be used including a single addition before the start of polymerization, continuously throughout the polymerization, or in doses or intervals at predetermined times during the polymerization. The amount of chain train transfer agent supplied to the polymerization reactor is preferably about 0.005 to about 5 wt %, more preferably from about 0.01 to about 2 wt % based upon the weight of the resulting fluoropolymer.

Polymerization Agent

In accordance with the invention, the fluoropolyether acid or salt thereof and the fluoropolyether surfactant are preferably dispersed adequately in aqueous medium to function effectively as a polymerization agent. "Dispersed" as used in this application refers to either dissolved in cases in which the fluoropolyether acid or salt and/or the fluoropolyether surfactant are soluble in the aqueous or dispersing in cases in which the fluoropolyether acid or salt and/or the fluoropolyether surfactant are not fully soluble and are present in very small particles, for example about 1 nm to about 1 μm, in the aqueous medium. Similarly, "dispersing" as used in this application refers to either dissolving or dispersing the fluoropolyether acid or salt and/or the fluorosurfactant so that they are dispersed as defined above. Preferably, the fluoropolyether acid or salt and fluoropolyether surfactant are dispersed sufficiently so that the polymerization medium containing fluoropolyether acid or salt and fluoropolyether surfactant appears water clear or nearly water clear. More preferably, an aqueous concentrate of the dispersed fluoropolyether acid salt and fluoropolyether surfactant adjusted to contain 1500 ppm±100 ppm of the fluoropolyether acid or salt has a haze in the test method described hereinafter of less than about 10% and most preferably less than about 7%. A preferred range for the haze of the aqueous concentrate of the dispersed fluoropolyether acid or salt is from about 0 to about 10%.

Low haze values at 1500 ppm±100 ppm for the dispersed fluoropolyether acid or salt correlate with performance of the polymerization agent in the aqueous polymerization process, e.g., polymerizations employing lower haze concentrates produce less undispersed polymer (coagulum) than concentrates with higher haze values. Typically, the concentration of the fluoropolyether surfactant in such concentrates does not affect the haze value as significantly as the fluoropolyether acid or salt, so concentrations for the dispersed fluoropolyether acid or salt of 1500 ppm±100 ppm are used for haze measurements rather than measuring haze at a selected concentration of the polymerization agent containing both fluoropolyether acid or salt thereof and the fluoropolyether surfactant. Haze values of the aqueous polymerization medium itself containing the dispersed fluoropolyether salt are less sensitive to the contribution of haze by the fluoropolyether salt because of the low fluoropolyether salt content and may be affected by other components in the aqueous polymerization medium.

Dispersing of the fluoropolyether acid or salt thereof and the fluoropolyether surfactant can be carried out in variety of methods. In one suitable procedure, the polymerization agent can be made directly in the aqueous polymerization medium. In this procedure, the fluoropolyether acid or salt is supplied in acid form and subsequently converted to salt form. This is accomplished by first adding ammonium hydroxide or alkali metal hydroxide, preferably ammonium hydroxide, to the aqueous polymerization medium in a quantity sufficient to substantially completely convert to salt form the subsequently added fluoropolyether acid. The fluoropolyether acid can then be added to the ammonium hydroxide or alkali metal hydroxide solution and, if desired, pH measurements can be made to determine if insufficient or excess base has been used. In addition, as known in the art, the amount of ammonium hydroxide or alkali metal hydroxide used, together with other materials added to the polymerization medium, should provide a pH in the aqueous polymerization medium which promotes the desired level of activity for the particular initiator system used and provides an operable pH range for the polymerization agent. The fluoropolyether surfactant can be added to the aqueous polymerization medium prior to, simultaneously with or subsequently to the addition of the fluoropolyether acid.

In accordance with a preferred form of the process of the invention which is especially useful when the fluoropolyether surfactant is a short chain surfactant, the procedure for making the polymerization agent employs making an aqueous concentrate of the dispersed fluoropolyether acid or salt and fluoropolyether surfactant which is subsequently added to a larger volume of aqueous polymerization medium. The concentrate can be made by reacting the fluoropolyether acid with a small volume of aqueous ammonium hydroxide or alkali metal hydroxide to produce the concentrate containing the salt form of the fluoropolyether acid. The surfactant is then added to the concentrate, preferably in the form of an ammonium or alkali metal salt. Alternatively, the reacting of the fluoropolyether acid with a small volume of aqueous ammonium hydroxide or alkali metal hydroxide to make the concentrate is done in the presence of the surfactant.

An appropriate quantity of the concentrate of the dispersed fluoropolyether acid or salt and fluoropolyether surfactant is then mixed into the aqueous polymerization medium to supply the already dispersed fluoropolyether acid or salt and fluoropolyether surfactant in the desired quantity. Preferably, the amount ammonium hydroxide or alkali metal hydroxide used to make the concentrate should provide a pH in the aqueous polymerization medium which promotes the desired level of activity for the particular initiator system used and provides an operable pH range for the polymerization agent.

In a preferred form of the invention, dispersing aids are used to assist with dispersing of the fluoropolyether acid or salt by contacting the acid or salt with the dispersing aid. A dispersing aid is especially useful for dispersing higher molecular weight fluoropolyether acid or salt thereof, e.g., above about 1200 g/mol. Dispersing aids are useful for either procedure discussed above for dispersing the fluoropolyether acid or salt, i.e., for dispersing into the polymerization medium or dispersing into the concentrate. Preferably, fluoropolyether acid or salt is contacted with the dispersing aid prior to dispersing the fluoropolyether acid or salt in the aqueous medium of the concentrate. Fluoropolyether surfactant can be added after the fluoropolyether acid or salt is dispersed.

Any of a variety of dispersing aids may be used to aid in dispersing the fluoropolyether acid or salt for use in accordance with the present invention. A surfactant, preferably the fluoropolyether acid or salt surfactant to be used in polymerization, is useful to disperse fluoropolyether acid or salt. In general, and particularly when polymerizing a high molecular weight fluoropolymer, a low telogenic or non-telogenic dispersing aid is preferred. With some dispersing aids, it is desirable to mix the dispersing aid with fluoropolyether acid or salt prior to addition to the aqueous polymerization medium or to the aqueous medium that forms the concentrate.

One suitable class of dispersing aids includes C3 to C8 alcohols with a particularly suitable dispersing aid being t-butanol. When the fluoropolyether acid or salt is supplied in acid form and the ammonium salt is to be used in the polymerization agent, concentrates can be formed by simultaneously mixing fluoropolyether acid, t-butanol, and an aqueous ammonium hydroxide solution and stirring. Fluoromonoether acid or salt to form the effective polymerization agent combination can be added subsequently. Preferably, t-butanol is added in an amount of about 0.5× to about 3× the weight of the fluoropolyether acid although the lowest amount which is effective is preferably employed to decrease telogenic effects. C3 to C8 alcohols such as t-butanol would generally not be used for polymerization of PTFE or modified PTFE because their telogenic activity may interfere with achieving the high molecular weight usually desired. In some cases, it is desirable for water to be present with the C3 to C8 alcohol, i.e., an alcohol/water mixture is used, to effectively disperse the fluoropolyether acid or salt.

In accordance with another preferred form of the invention, the fluoropolyether acid or salt is supplied in acid form and also the fluoropolyether surfactant to be used is also be supplied in acid form ($Y^+$ in Formula I is H). This form of the invention is especially useful when the fluoropolyether surfactant is a short chain surfactant. It has been discovered that the fluoropolyether acid and fluoropolyether surfactant in acid form will form a mixture which can readily be dispersed into an aqueous medium, i.e., the aqueous polymerization medium or aqueous solution to make the concentrate. In addition, the acid mixture is readily dispersed even when the fluoropolyether carboxylic acid has a high molecular weight and may otherwise require a dispersing aid. This preferred procedure is especially useful in the production of PTFE or modified PTFE where the telogenic effects of dispersing aids such as t-butanol may make it difficult to achieve a desired high molecular weight and would adversely affect the use of wax. In this preferred form of the invention, the fluoropolyether acid and fluoropolyether surfactant in acid form are mixed together to form an acid mixture prior to addition to the aqueous polymerization medium or a concentrate. Preferably, the mixture of the fluoropolyether acid and fluoropolyether surfactant in acid form comprises less than about 50 wt % water. In a preferred form of the invention which employs the polymerization agent in salt form, this acid mixture is contacted with ammonium hydroxide or alkali metal hydroxide. More preferably, this mixture is contacted with an aqueous ammonium hydroxide solution to form dispersed fluoropolyether salt and fluoropolyether surfactant in ammonium salt form. In one preferred form of the invention, the contacting of the acid mixture with ammonium hydroxide or alkali metal hydroxide is performed by providing the ammonium hydroxide or alkali metal hydroxide in the polymerization medium and mixing the acid mixture into the polymerization medium to disperse the salts of the fluoropolyether acid and fluoropolyether surfactant into the polymerization medium. In another preferred form of the process, the contacting of the acid mixture with ammonium hydroxide or alkali metal hydroxide is performed using aqueous ammonium hydroxide or aqueous alkali metal hydroxide to form an aqueous concentrate comprising dispersed salts of the fluoropolyether acid and fluoropolyether surfactant. The aqueous concentrate is added to the aqueous polymerization medium to disperse the salts of the fluoropolyether acid and fluoropolyether surfactant in the polymerization medium.

For the manufacture of concentrates containing dispersed fluoropolyether acid or salt and fluoropolyether surfactant, aqueous ammonium hydroxide or aqueous alkali metal hydroxide solutions are preferably employed. Ammonium salts are preferred for the practice of this invention and thus aqueous ammonium hydroxide is preferably used. The aqueous ammonium hydroxide employed preferably has an ammonia content of about 15 to about 40 wt %.

To facilitate manufacture of the polymerization agent concentrates, is it sometimes desirable to first make a concentrate with a very high amount of the polymerization agent, e.g., 5000 to 500,000 ppm dispersed fluoropolyether acid or salt. Although this "superconcentrate" can be introduced directly into the polymerization medium, it is preferably diluted with a modest amount (10 to 100 volumes) of water first to make a concentrate which provides the dispersed polymerization agent to the aqueous polymerization medium. In adding the superconcentrate to the dilution water, it is preferred that the water be vigorously stirred and the concentrate be added slowly, dropwise or through a capillary or small diameter tube immersed in the stirred water at a point of high shear. If the superconcentrate is introduced into the polymerization vessel undiluted, the addition to water in the polymerization vessel preferably should similarly be done gradually with vigorous mixing. Vigorous mixing is generally desirable at all stages of manufacture of polymerization agent concentrates and introduction into the aqueous polymerization medium.

Preferred aqueous concentrates employed in accordance with the invention comprise about 1 to about 95 wt % water, most preferably about 50 to about 95 wt % water. Preferably, the aqueous concentrate comprises about 0.5 to about 50 wt % dispersed fluoropolyether acid or salt. Preferred concentrates are stable at room temperature, i.e., such concentrates can stand for at least one week at room temperature without any substantial quantity of the fluoropolyether acid or salt and fluoropolyether surfactant separating from the concentrate.

In a preferred form of the invention, the polymerization agent employed in accordance with the present invention comprises a major amount by weight of fluoropolyether acid or salt surfactant and a minor amount by weight of fluoropolyether acid or salt thereof. More preferably, the fluoropolyether surfactant comprises at least about 55 wt % of the polymerization agent, most preferably, at least about 65 wt % of the polymerization agent. This form of the invention can be used with various fluoropolymers but is particularly useful for the polymerization of PTFE or modified PTFE having a comonomer content of no greater than about 1 wt %. In another preferred form of the invention, the polymerization agent comprises a major amount of said fluoropolyether acid or salt thereof and a minor amount of fluoropolyether acid or salt surfactant. This form of the invention is useful for melt-processible copolymers such as copolymers comprising at least about 60-98 wt % tetrafluoroethylene units and about 2-40 wt % of at least one other monomer. It is generally desirable for the exact proportion of fluorosurfactant to the fluoropolyether acid or salt in the polymerization agent to be adjusted depending upon the fluorosurfactant used, the molecular weight of the fluoroacid or salt used, the intended properties for the fluoropolymer dispersion, etc.

Preferably, the amount of fluoropolyether acid or salt used in the aqueous polymerization medium is about 5 to about 3,000 ppm based on the weight of water in the aqueous polymerization medium. More preferably, the amount of fluoropolyether acid or salt used in the aqueous polymerization medium is about 5 to about 2000 ppm based on the weight of water in the aqueous polymerization medium, even more preferably about 50 to about 1000 ppm, and most preferably about 100 to about 350 ppm. The total amount of polymerization agent combination used in a preferred process in accordance with the invention is about 5 to about 10,000 ppm based on the weight of water in the aqueous medium, more preferably about 5 to about 3000 ppm based on the weight of water in the aqueous medium. Even more preferably, the total amount of polymerization agent combination used is about 50 to about 3000 ppm based on the weight of water in the aqueous medium, still more preferably about 50 ppm to about 2000 ppm, more preferably, about 150 ppm to about 500 ppm.

At least a portion of the polymerization agent is preferably added to the polymerization prior to the beginning of the polymerization. If added subsequently, a variety of modes of addition for the polymerization agent may be used including continuously throughout the polymerization, or in doses or intervals at predetermined times during the polymerization. In accordance with one embodiment of the invention, substantially all of the polymerization agent is added to the aqueous medium prior to the start of polymerization, preferably prior to initiator addition.

In accordance with the invention, the aqueous medium comprises less than about 300 ppm of perfluoroalkane carboxylic acid or salt fluorosurfactants having 8 or more carbon atoms, based on the weight of water in the aqueous medium. Perfluoroalkane carboxylic acid or salt fluorosurfactants having 8 or more carbon atoms include such surfactants having for example 8-14 carbon atoms, e.g., perfluorooctanoic acid and salts and perfluorononanoic acid and salts. Preferably, the aqueous medium comprises less than about 100 ppm of perfluoroalkane carboxylic acid or salt fluorosurfactants having 8 or more carbon atoms, more preferably less than 50 ppm. In a preferred embodiment of the invention, the aqueous medium is substantially free of perfluoroalkane carboxylic acid or salt fluorosurfactants having 8 or more carbon atoms. Substantially free of perfluoroalkane carboxylic acid or salt fluorosurfactants having 8 or more carbon atoms means that aqueous medium contains no more than about 10 ppm of such fluorosurfactants.

In accordance with a preferred form of the invention the polymerization agent combination used in the practice of this invention is preferably substantially free of perfluoropolyether oil (i.e., perfluoropolyethers having neutral, nonionic, preferably fluorine or hydrogen, end groups). Substantially free of perfluoropolyether oils means that aqueous polymerization medium contains no more than about 10 ppm of such oils based on water. This form of the invention is unlike the aqueous microemulsion system as disclosed in U.S. Pat. No. 4,864,006 to Gianetti et al. which employs such perfluoropolyether oils. Thus, the fluoropolymer dispersion preferably produced has high purity and contains low residual surfactant and preferably is substantially free of perfluoropolyether oils. Moreover, in a preferred process, the polymerization medium is substantially free of fluoropolymer seed at polymerization kick-off. In this preferred form of the invention, fluoropolymer seed, i.e., separately polymerized small fluoropolymer particles in dispersion form, is not added prior to the start of polymerization.

It has been found that a fluoropolyether acid or salt having a number average molecular weight of at least about 800 g/mol in combination with a fluoropolyether acid or salt surfactant, especially a fluoropolyether acid or salt surfactant having a molecular weight of less than about 600 g/mol, provides an effective polymerization agent for use in the manufacture of fluoropolymers. The polymerization agent combination can produce fluoropolymers equivalent to those made using the typical perfluoroalkane carboxylic acid surfactants disclosed in U.S. Pat. No. 2,559,752 to Berry and at high dispersion solids concentrations. A process employing a polymerization agent in accordance with the invention provides reduced undispersed polymer (referred to as coagulum) compared to fluoropolyether surfactant used alone.

Test Methods

Comonomer content (PPVE) is measured by FTIR according to the method disclosed in U.S. Pat. No. 4,743,658, col. 5, lines 9-23.

Particle size, i.e., raw dispersion particle size is determined by laser fraction techniques that measure the particle size distributions PSD of materials using a Beckman Coulter LS13320 instrument with a wet module. Aliquots of the samples are introduced to the instrument recirculating system until it reaches optimum obscuration. The recirculating speed is set at 30% to prevent particle aggregation. The PSD measurements are repeated twice to investigate sample stability and assure measurement reproducibility.

Haze is measured on an aqueous concentrate of the dispersed fluoropolyether acid or salt and fluoropolyether acid or salt surfactant (and dispersing aid, if used) which is adjusted to contain 1500 ppm±100 ppm of the fluoropolyether acid or salt. The haze is measured in transmission mode on a Hunter® ColorQuest XE spectrophotometer with sphere geometry using HunterLab Universal Software v 4.0. The sample cell is a 50 mm transmission cell. The transmission haze measurement is the ratio of diffused light to the total light transmitted by a specimen multiplied by 100 to express a percentage of transmission.

EXAMPLE

The process is illustrated in the polymerization of copolymers of tetrafluoroethylene (TFE) with perfluoro(alkyl vinyl ether), i.e., perfluoro(propyl vinyl ether).
Polymerization Agent Components The fluoropolyether acid or salt surfactant employed has a formula $CF_3CF_2$—O—$CF_2CF_2$—O—$CF_2COOH$ (difluoro[1,1,2,2-tetrafluoro-2-(pentafluoroethoxy)ethoxy]-acetic acid, EEA). The acid fluoride precursor for this surfactant is available from Exfluor Research Corporation (Round Rock, Tex., USA) and can be converted and isolated as the free carboxylic acid. It is then converted to the ammonium salt (EEA-$NH_4$) for use as a surfactant.

In the Example of the invention, a fluoropolyether acid available commercially from DuPont is employed which is a perfluoropolyether acid having carboxylic acid group (PFPEA) and having the repeat unit of Formula V above. This perfluoropolyether acid has a number average molecular weight of about 2100 (n=about 12 in Formula V).
Comparative An initiator solution is made by dissolving 1.0 g ammonium persulfate in 1000 g deionized water.

A surfactant concentrate is made by adding 6.7 g EEA-$NH_4$ to 40 g deionized water (14.3 wt. % EEA-$NH_4$ solution) which dissolves immediately to produces a colorless liquid having a haze less than 7%.

Deaerated water is used in the polymerization. It is prepared by pumping deionized water into a large stainless steel vessel and vigorously bubbling nitrogen gas for approximately 30 minutes through the water to remove all oxygen.

The reactor is a 1 liter vertical autoclave made of Inconel®, equipped with a ribbon agitator and a baffle insert. No chain transfer agent is used.

A vacuum of approximately −13 PSIG (−11.7 kPa) is applied to the reactor. This is used to draw in 5.4 g of the EEA-$NH_4$ concentrate and 500 ml deaerated water as a precharge. The reactor is then purged three times (agitator=100 rpm) by pressurization with nitrogen gas to 80 PSIG (653 kPa) followed by venting to 1 PSIG (108 kPa) to reduce oxygen content. It is further purged three times (agitator=100 rpm) by pressurization with gaseous tetrafluoroethylene (TFE) to 25 PSIG (274 kPa) followed by venting to 1 PSIG (108 kPa) further insuring that the contents of the autoclave are free of oxygen. The agitator rate is increased to 600 rpm, the reactor is heated to 65° C., and then perfluoro(propyl vinyl ether) (PPVE) (12.8 g) is pumped as a liquid into the reactor.

When at temperature, the reactor pressure is raised to a nominal 250 PSIG (1.83 MPa) by adding TFE (~38 g). Initiator solution is fed to the reactor at a rate of 20 ml/min for 1 min. to provide a precharge of 0.02 g ammonium persulfate. It is then pumped at a rate of 0.25 ml/min. until the end of the batch which is defined as the point at which 90 g of TFE has been consumed, measured as mass loss in a TFE weigh tank.

At kickoff (defined as the point at which a 10 PSIG (70 kPa) pressure drop is observed) the polymerization is deemed to have started, which is also the start point for feeding PPVE at a rate of 0.12 g/min. for the rest of the polymerization. Reactor pressure is kept constant at 250 PSIG (1.83 MPa) by feeding TFE as needed throughout the entire polymerization.

After 90 g of TFE has been consumed, the agitator is slowed to 200 RPM, all feeds to the reactor are shut off, and the contents are cooled to 30° C. over the course of 30 minutes. The agitator is then turned down to 100 RPM and the reactor is vented to atmospheric pressure.

The type and quantities of surfactant and initiator and the polymerization times are indicated in Table 1A below. The fluoropolymer dispersion thus produced has a solids content and undispersed polymer quantity indicated in Table 1B below.

Polymer is isolated from the dispersion by freezing, thawing and filtration. The polymer is washed in demineralized water and filtered several times before being dried overnight in a vacuum oven at 80° C. and a vacuum of 30 mm Hg (4 kPa). Results are reported in Table 1B.

EXAMPLE

A polymerization agent concentrate is made up by adding 4.2 g EEA-$NH_4$ to 16.7 g deionized water which dissolves immediately to produce a colorless aqueous solution. To this solution is added 0.8 g PFPEA which is magnetically stirred for 8 hours to promote dispersing. Before addition to the reactor, the polymerization agent concentrate is a colorless single-phase liquid.

The procedure of the Comparative is employed except that the reactor is precharged with 4.1 g of the polymerization agent concentrate plus 500 ml deionized water.

The type and quantities of surfactant, PFPEA, initiator and the polymerization times are indicated in Table 1A below. The fluoropolymer dispersion thus produced has a solids content and undispersed polymer quantity indicated in Table 1B below.

Polymer is isolated from the dispersion by freezing, thawing and filtration. The polymer is washed in demineralized water and filtered several times before being dried overnight in a vacuum oven at 80° C. and a vacuum of 30 mm Hg (4 kPa). Results are reported in Table 1B.

TABLE 1A

TFE/PPVE Polymerization

| Example | Surfactant | Surfactant dry mass (g) | Surfactant mmol | Surfactant ppm | Total APS (g) | Time to kick-off (min.) | Time to consume 90 g TFE (min.) |
|---|---|---|---|---|---|---|---|
| Comp. Example | EEA-NH$_4$ | 0.78 | 2.14 | 1426 | 0.048 | 8 | 105 |
| Example | EEA-NH4 + PFPEA | 0.78 0.16 | 2.14 | 1448 297 | 0.043 | 13 | 79 |

TABLE 1B

TFE/PPVE Polymerization

| Example | % solids | Total polymer produced (g) | Ave. particle size (nm) | Undispersed Polymer (g) (Coagulum) g | wt % | Wt. % PPVE |
|---|---|---|---|---|---|---|
| Comp. | 15.6 | 105.4 | 146 | 4.4 | 4.2 | 4.4 |
| Example | 16.0 | 103.2 | 84 | 0.2 | 0.19 | 6.1 |

What is claimed is:

1. A process comprising polymerizing at least one fluorinated monomer in an aqueous medium containing initiator and polymerization agent to form an aqueous dispersion of particles of fluoropolymer, said polymerization agent comprising:

monofunctional fluoropolyether acid or salt thereof having a number average molecular weight of about 1000 to about 2500 g/mol; and fluoropolyether acid or salt surfactant being a compound of the formula:

[R$^1$—O-L$^1$-O-L$^2$-A$^-$]Y$^+$ wherein:
R$^1$ is a linear or branched partially or fully fluorinated aliphatic group which may contain ether linkages;
L$^1$ and L$^2$ are a linear or branched alkylene groups which may be the same or different nonfluorinated, partially fluorinated or fully fluorinated and which may contain ether linkages;
A$^-$ is an anionic group selected from the group consisting of carboxylate, sulfonate, sulfonamide anion and phosphonate; and
Y$^+$ is hydrogen, ammonium or alkali metal cation,
said fluoropolyether acid or salt surfactant having a molecular weight of about 300 to about 500 g/mol.

2. The process of claim 1 wherein:
R$^1$ is a linear or branched partially or fully fluorinated alkyl group having 1 to 4 carbon atoms which may contain ether linkages; and
L$^1$ and L$^2$ are alkylene groups independently selected from —CX(R$^2$)— and —CX(R$^2$)CZ$^1$Z$^2$—, wherein R$^2$ is fluorine or perfluoromethyl and X is hydrogen or fluorine, and —CZ$^1$Z$^2$CZ$^3$Z$^4$—, wherein Z$^1$, Z$^2$, Z$^3$, and Z$^4$ are independently selected from hydrogen or fluorine, and —CZ$^1$Z$^2$CZ$^3$Z$^4$CZ$^5$Z$^6$—, wherein Z$^1$, Z$^2$, Z$^3$, Z$^4$, Z$^5$, and Z$^6$ are independently selected from hydrogen or fluorine.

3. The process of claim 1 wherein:
L$^1$ and L$^2$ are alkylene groups independently selected from —CF(CF$_3$)—, —CF(CF$_3$)CF$_2$—, —CF$_2$—, —CF$_2$CF$_2$—, —CF$_2$CF$_2$CF$_2$—, —CHFCF$_2$—, and —CF$_2$CHF—.

4. The process of claim 1 wherein R$^1$ is a linear partially or fully fluorinated alkyl group having 2 to 3 carbon atoms.

5. The process of claim 1 wherein R$^1$ is fully fluorinated.

6. The process of claim 1 wherein:
R$^1$ is CF$_3$CF$_2$—;
L$^1$ is —CF$_2$CF$_2$—;
L$^2$ is —CF$_2$—;
A$^-$ is carboxylate; and
Y$^+$ is hydrogen or ammonium.

7. The process of claim 1 wherein said aqueous medium contains less than about 300 ppm of perfluoroalkane carboxylic acid or salt fluorosurfactant having 8 or more carbon atoms based on the weight of water in said aqueous medium.

8. The process of claim 1 wherein said fluoropolyether acid or salt thereof having a number average molecular weight of about 1000 to about 2500 g/mol comprises acid groups selected from carboxylic acid, sulfonic acid, sulfonamide and phosphonic acid.

9. The process of claim 1 wherein said polymerization agent is present in said aqueous medium in an amount of about 5 ppm to about 3000 ppm based on the weight of water in said aqueous medium.

10. The process of claim 1 wherein said polymerization agent is present in said aqueous medium in an amount of about 50 ppm to about 2000 ppm based on the weight of water in said aqueous medium.

11. The process of claim 1 wherein said aqueous dispersion of particles of fluoropolymer formed by said process has a fluoropolymer solids content of at least about 10 wt %.

12. The process of claim 1 wherein said aqueous dispersion of particles of fluoropolymer formed by said process has a fluoropolymer solids content of about 20 wt % to about 65 wt %.

13. The process of claim 1 wherein said polymerization agent comprises minor amount of fluoropolyether acid or salt thereof and a major amount of said fluoropolyether acid or salt surfactant.

14. The process of claim 1 wherein said fluoropolyether acid or salt surfactant comprises at least about 55 wt % of said polymerization agent.

15. The process of claim 1 wherein said fluoropolyether acid or salt surfactant comprises at least about 65 wt % of said polymerization agent.

16. The process of claim 1 wherein said aqueous medium is substantially free of perfluoropolyether oil.

17. The process of claim 1 wherein said polymerization medium is substantially free of fluoropolymer seed at polymerization kick-off.

18. The process of claim 1 wherein said polymerizing produces less than about 10 wt % undispersed fluoropolymer based on the total weight of fluoropolymer produced.

19. The process of claim 1 wherein said polymerizing produces less than about 3 wt % undispersed fluoropolymer based on the total weight of fluoropolymer produced.

20. The process of claim 1 wherein said fluoropolymer produced by said process is a non-melt-processible polymer selected from the group consisting of polytetrafluoroethylene and copolymers of tetrafluoroethylene comprising less than 1 wt % comonomer.

21. The process of claims 1 wherein said fluoropolymer produced by said process is a melt-processible copolymer comprising at least about 40-98 mol % tetrafluoroethylene units and about 2-60 mol % of at least one other monomer.

* * * * *